United States Patent
Dagdelen Uysal et al.

(10) Patent No.: US 12,493,851 B2
(45) Date of Patent: Dec. 9, 2025

(54) METHOD OF DATA DRIVEN REGULATION FOR CANNABIS

(71) Applicant: METRC LLC, Lakeland, FL (US)

(72) Inventors: Dilek Dagdelen Uysal, Lakeland, FL (US); Jeffrey Lane Wells, Lakeland, FL (US)

(73) Assignee: Metrc LLC, Lakeland, FL (US)

( * ) Notice: Subject to any disclaimer, the term of this patent is extended or adjusted under 35 U.S.C. 154(b) by 418 days.

(21) Appl. No.: 17/678,647

(22) Filed: Feb. 23, 2022

(65) Prior Publication Data

US 2022/0270036 A1 Aug. 25, 2022

Related U.S. Application Data

(60) Provisional application No. 63/152,548, filed on Feb. 23, 2021.

(51) Int. Cl.
*G06Q 10/087* (2023.01)
*A61K 31/00* (2006.01)
*G01N 33/94* (2006.01)
*G06K 7/10* (2006.01)

(52) U.S. Cl.
CPC ......... *G06Q 10/087* (2013.01); *A61K 31/658* (2023.05); *G01N 33/948* (2013.01); *G06K 7/10297* (2013.01)

(58) Field of Classification Search
CPC .. G06Q 10/087; A61K 31/352; G01N 33/948; G06K 7/10297
USPC .......................................................... 705/28
See application file for complete search history.

(56) References Cited

U.S. PATENT DOCUMENTS

| | | |
|---|---|---|
| 2016/0207679 A1 | 7/2016 | Jackson |
| 2018/0114168 A1 | 4/2018 | Ryan |
| 2019/0303846 A1 | 10/2019 | Kaweske et al. |
| 2022/0092669 A1* | 3/2022 | Abrahamian ...... G06Q 30/0631 |

FOREIGN PATENT DOCUMENTS

| | | | | |
|---|---|---|---|---|
| CN | 113519002 A | * | 10/2021 | ........... A23D 7/0053 |
| WO | 2020/073135 A1 | | 4/2020 | |
| WO | WO-2020084446 A1 | * | 4/2020 | ........... G06F 16/245 |
| WO | 2020/102669 A1 | | 5/2020 | |

OTHER PUBLICATIONS

Frey, Seth et al. ""This Place Does What It Was Built For" Designing Digital Institutions for Participatory Change." Proceedings of the ACM on human-computer interaction 3.CSCW (2019): 1-31.

Anonymous, "metro Industry Generic User Guide", (2017) Version 7.1.

* cited by examiner

*Primary Examiner* — Luna Champagne
(74) *Attorney, Agent, or Firm* — SALIWANCHIK, LLOYD & EISENSCHENK (57) ABSTRACT

A method and system in accordance with the subject invention establishes industry norms for every step in the production, cultivation, harvest, and packaging process for a regulated industry to follow with respect to a regulated product. An embodiment relates to the regulated product cannabis where product is accurately recorded into the system is legal while any product that is not recorded into the system is illegal.

33 Claims, 8 Drawing Sheets

Lab Test "Failed" with 2 Samples; 1 sample passed 1 sample fails

Lab Test "Passed" with 2 Samples

METHOD OF DATA DRIVEN REGULATION FOR CANNABIS

CROSS-REFERENCE TO A RELATED APPLICATION

This application claims the benefit of U.S. provisional application Ser. No. 63/152,548, filed Feb. 23, 2021, which is incorporated herein by reference in its entirety.

FIELD OF INVENTION

The subject invention relates to a data-driven, evidence-based approach that provides evidence that a problem existence and shows the source of the problem to generate solutions. The data driven regulation approach using real time tracking and monitoring method described herein allows an entity such as a regulatory body, agency, and/or the State (e.g., regulator) to respond or diagnose the problems as they arise and provide better-informed policy and regulatory decisions. The subject invention can also reduce the regulatory costs for government, enhance public safety by ensuring quality, undermine illegal markets to reduce crime, and prevent product diversion by monitoring product sales.

BACKGROUND OF THE INVENTION

The aim of the regulatory process is to protect the public and improve the health, safety, environment, and well-being of the public. To establish regulations, Executive Order 12866 indicates that an agency shall "identify the problem that it intends to address (including, where applicable, the failures of private markets or public institutions that warrant new agency action), as well as assess the significance of that problem." Each regulation depends on the assessment of how well an agency analyzes the situation and the systemic problem.

For a successful implementation of a regulation, the regulation also needs to be clear and accessible.

BRIEF SUMMARY OF THE INVENTION

A method and system in accordance with the subject invention, a specific embodiment of which can be referred to as the METRC system, can be used to track and monitor every step in the cultivation, harvest, and packaging process for the cannabis industry to follow. This simply makes the product (e.g., cannabis) that is accurately recorded into the system (e.g., the METRC system) legal, while any product that is not recorded into the system is illegal. Embodiments of the invention can be used to track and monitor other products, such as other horticultural products, drugs, foods, plants, and animals.

The data driven regulation approach using real time tracking and monitoring method described herein allows an entity such as a regulatory body, agency, and/or the State (e.g., regulator) to respond or diagnose the problems as they arise and provide better-informed policy and regulatory decisions. The subject invention can also reduce the regulatory costs for government, enhance public safety by ensuring quality, undermine illegal markets to reduce crime, and prevent product diversion by monitoring product sales.

DETAILED DESCRIPTION OF THE INVENTION

Embodiments of the subject system and method (e.g., METRC system) is organized into two main infrastructures: the industry (regulated entity) and the regulatory entity (regulator), such as a government agency. On the industry side the system collects data for every event of the product lifecycle from origin to sale, and on the regulatory agency side the system provides compliance management oversight for one or more of the following: licensing, inspecting, auditing, enforcing, analyzing, and collecting the data.

Embodiments of the subject regulatory process implement one or more functionalities, such as product categorization, administration, configuration, analytics, inspection, rules-based notifications, recalls, and enforcement of the solution. These functionalities are created with the following components, which are originated by a unique reporting method of the events that the product go through.

Figure 1:
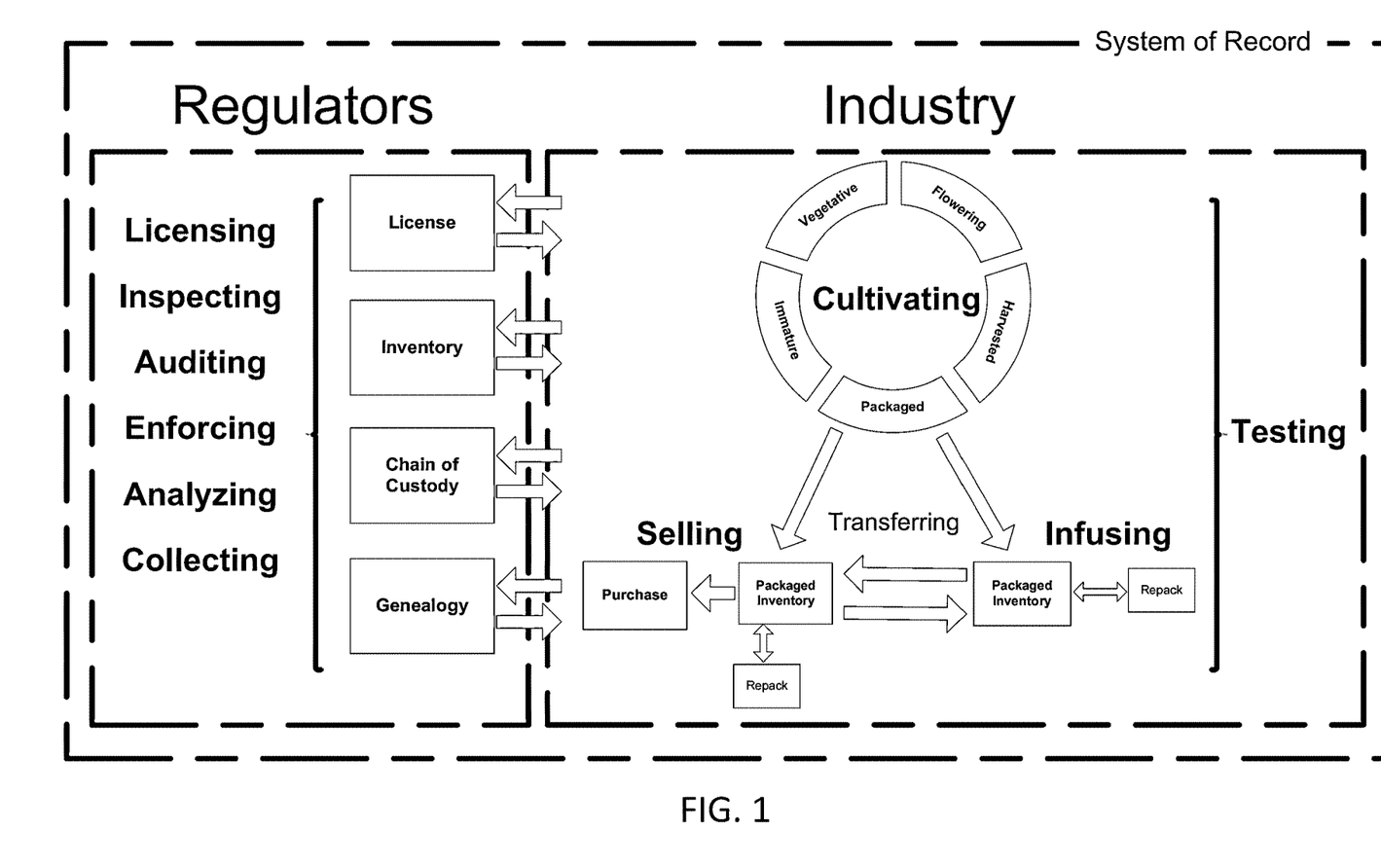
FIG. 1 illustrates typical functions performed by government agencies (regulators) and industry, and the exchange of data between the regulators and industry.

FIG. 1 shows a schematic of a regulatory process, where regulators provide the guidelines and industry (regulated entities) conduct their operations and interact with a system of record (e.g., monitoring system) in accordance with the regulatory process. FIG. 1 includes activities specific to specific embodiment related to cannabis, such as cultivating activities and packaging for sale. These activities can be modified for each industry and can include activities related to production of a regulated product and activities related to the packaging of the product for sale.

Figure 2:
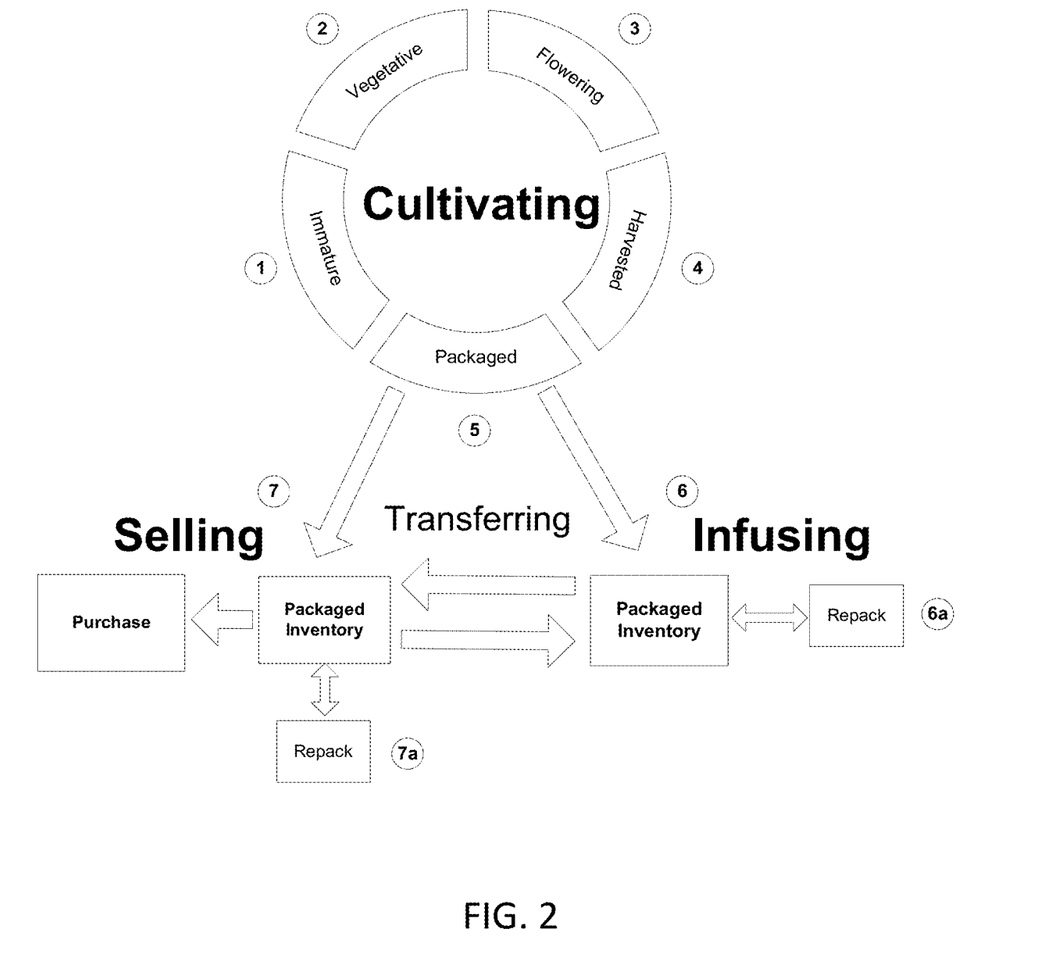
FIG. 2 illustrates various functions involved in product production and their interconnections.

FIG. 2 shows a portion of FIG. 1 relating to the activities of the regulated entities (industry) including various functions involved in product production and their interconnections, for an embodiment relating to cannabis. Embodiments relating to other products can use one or more of these functions and/or one or more additional functions. The following steps, associated processes, and descriptions are numbered in FIG. 2.

| Step | Process | Description |
| --- | --- | --- |
| 1 - Immature | Cultivating | Cuttings, seedlings, or clones are grouped and identified as an immature batch. |

| Step | Process | Description |
|---|---|---|
| 2 - Vegetative | Cultivating | An immature plant becomes a vegging plant when the plant is larger than 8" and/or in a container larger than 2". Unique RFID tag is assigned to the vegging plant (Vegetative). |
| 3 - Flowering | Cultivating | A vegging plant becomes a flowering plant when the light cycle changes to 12 hours on, 12 hours off. |
| 4 - Harvested | Cultivating | The process of cutting down a plant and obtaining the wet weight before initiating the trim process is performed only on plants in the flower phase. |
| 5 - Packaged | Cultivating | Cannabis of the same strain in the form of buds or shake (by weight) may be packaged and sold or processed into hash or infused products. Unique RFID label is assigned to the package (Harvest Packaged). |
| 6 - Manufacturing | Infusing | Packaged inventory is transferred to an infusing business by its own cultivation or from another selling business for the purpose of producing infused products |
| 6a - Manufacturing Repack | Infusing | An infusing business will repack its infused product for transfer to a selling business. Unique RFID label is attached to the package (Repack). |
| 7 - Dispensing | Selling | Packaged inventory is transferred to a selling business from an infusing business, for the purpose of selling inventory. |
| 7a - Dispensing Repack | Selling | A selling business will repack inventory for transfer to another selling or infusing business. Unique RFID label is attached to the package by the transferring business (Repack). |
| 8 - Purchase | Selling | A selling business will sell from packaged inventory. (Product Sales) |

In a specific embodiment, immature plants 1 need not have a physical marker with a unique identification (UID) associated with the immature plant. Once the immature plant becomes vetitive, a physical marker with a UID is assigned to the vegging plant (vegetative) 2 and an origin event is sent to the control organization for recording in the monitoring system where the UID is then associated with the vegging plant 2. Additional events with respect to the vegging plant (e.g., flowering 3 and harvesting 4) can be recorded in the monitoring system and activities in the events associated with the UID. Upon the harvested plant being incorporated into a packaged product 5, a new UID can be associated with the packaged product along with the UIDs of all the plants incorporated into the packaged product being associated with the new UID of the packaged product.

Events relating to additional activities in the manufacture of the packaged product, such as infusing 6, can be sent to and recorded in the monitoring system. Events related to activities that involve a new packaged product that may incorporate portions of multiple previous packaged products, or otherwise fall within a guideline to assign a new MD, such as repacking 6a, can include assigning a new UID to the repacked package and recording the same in the monitoring system. Events relating to further activities, such as dispensing, selling, and/or packaging 7, 7a, 8 can be sent to and recorded in the monitoring system, will some activities triggering the assignment of a new UID 7a.

Embodiments can implement one or more of the following components of the regulatory process:

1) Unique Identification:

Unique identification is an important building block of this data driven regulation process, where no other supply chain is regulated in the same way. In a specific embodiment where the products are regulated through this method, the method starts with providing a monitoring system having a processor and memory that can receive and store data relating to unique identifications and requests, events, products, and item categories, as well as allowing outputting stored regarding same and package tracing and tracking and other outputs incorporating such stored information. The regulated entity (e.g., a Licensee) can then request the provisioning of one or more unique identifications (UIDs) associated with the regulatory system. Such request can be handled by a central organization, working in conjunction with a regulator. The regulated entity can also order a corresponding one or more physical markers from the central organization, authorization to procure physical markers from another source, or authorization to produce such physical markers. Whether the physical markers are provided by the central organization, or the regulated entity produces the physical markers, or the regulated entity procures the physical markers, each physical marker incorporates a corresponding UID requested by the regulated entity, such that the UID is encoded in the physical marker and/or the physical marker has the UID printed or otherwise located on the physical marker so the UID can be visually read. In this way, the UID can be electronically read (e.g., via an RFID reader or other scanner), and/or the UID on the physical marker can be visually read. In an embodiment, visually reading the UID can be accomplished by imaging the UID and recognizing the UID (e.g., OCR).

The central organization assigns unique identifications (UIDs), such as systematically generated EPC numbers, QR codes, images, or other format. In a specific embodiment, the central organization encodes the physical markers (e.g., RFID tags) with the corresponding UIDs and sends them to the Licensees (regulated entities) (such as described in PCT/US2019/061703, which is hereby incorporated by reference). These UIDs provided to the regulated entity are recorded in the system and associated with the Licensee (regulated entities). In a specific embodiment, as the regulated entity uses the physical markers for the plants or other product, the regulated entity assigns a physical marker to the plant or other product and provides the events associated with the plant or product to the central organization for recording in the monitoring system.

A specific embodiment for regulating cannabis uses RFID tags as the physical markers. In a specific embodiment for regulating cannabis using RFID tags, the Licensee assigns an RFID tag, with a corresponding UID, to a plant and records events such as the plant's growth stage, locations, strains, additives used during cultivation (such as pesticides), and plant waste, and updates the monitoring system with this information until the harvest of the plant. Upon harvesting the plant, the regulated entity then assigns another RFID tag to the packaged product into which the harvested plant is incorporated and provides updates to the central organization for recording in the monitoring system. This new RFID tag assigned to the packaged product has a corresponding UID that is unique. Such a harvest event, assuming all of the plant is harvested, is the last event for the plant as the entire plant is now gone. The harvest event is also the origin event for the package or packages the harvested plant is incorporated into. In an embodiment, a quantity of the plant can be tracked and recorded in the monitoring system as events are received from the regulated entity, and when the entire plant is gone the quantity will be zero or under some minimum threshold that can be interpreted as zero. In a specific embodiment, the physical markers are attached to the plant, package, or other physical form of the product, or otherwise tethered to the product.

2) Item Categorization:

At each stage of the production, cultivation, raising, and/or other phase of the supply chain of the regulated product, the product having the physical marker incorporating the UID also has an item category associated with the product, where the item category is selected from a defined list of item categories associated with the regulated product. The defined list of item categories can be provided by the regulator in accordance with the regulatory process. This allows the regulator to have a record of the state of the product at each stage of the process.

In an embodiment, before packaging, the product has an associated physical marker with a UID and has an item category associated with the product, and when the plant or product transitions from the cultivation, raising, or production phase to packaging for sale (an event), a new UID is assigned to the resulting package and another item category can be assigned to the package, and both the event and item category can be provided to the system for association with the new UID. Although some events that result in a new packaged product also result in the new packaged product having a different item category, other events that result in a new UID for the new packaged product can result in the new packaged product having the same item category.

In an embodiment relating to cannabis, when the plants are harvested, a new UID (e.g., harvest batch UID) is assigned to the resulting package harvested plants are incorporated into, and all the plant UIDs used for that harvest are associated with the new UID (e.g., harvest batch UID), where the new packaged product is associated with this new UID. Associating the plant UIDs of the harvested plants that were incorporated into the new packaged product with the new UID of packaged product, and storing such information in the monitoring system, allows the central organization or regulator to retrieve such information. In this way, a package genealogy of each of the harvested plants shows the harvested plant was incorporated into the packaged product, and a package genealogy of the packaged product shows all of the harvested plants that were incorporated into the packaged product. The user (licensee/regulated entity) then creates items for packaging by selecting a predefined item category that is determined by the regulator, e.g., the State. Each item category has certain set of parameters. For cannabis the parameters can include, for example, type, quantity type, strain, CBD %, and THC % determined through testing. These classificatory standards allow better understanding and consistency of the product descriptions for use in regulatory data analysis and oversight. "THC" (tetrahydrocannabinol) and "CBD" (cannabidiol) are two main active ingredients in cannabis that can factor in for a determination of the value, cost, and the usage of the product.

Prior methods involve the cannabis industry using strain name or product name that may or may not give any specific information and understanding about the product itself. As an example, the strain name for a classification that carries over from the black market can have little relation to genetics or other objective characteristics. Embodiments of the subject identification (e.g., item category) do not use black market names as the regulator's official product classification, but can allow a licensee to include an alias connected to the official product that can incorporate a black market or other unofficial identifier In this way, one licensee may include a first alias (or nick name) for a certain product, while another licensee may use a second alias (or nickname) for the same product, which has the same product classification for both licensees, where the product classification is provided by the regulator. The regulator's product classification (e.g., item category) provides uniformity and protects public safety, facilitates law enforcement, helps monitor revenue, and support regulatory policy. Having standard and consistent categories for the regulated products allows the regulatory agency, e.g., a regulator or a state, to be able to make specific set of rules for each product in the industry. As an example, if "bud" is selected for item category, the quantity type that needs to be indicated by the Licensee can be the weight, or number of allowed plants. By looking at the weight of the products being produced, the Regulator (e.g., the state) can set up the rules for weight limits for each package, or the number of allowed plants, and compare the expected harvest from the number of plants grown to the item's weight for the inspection.

Figure 3:
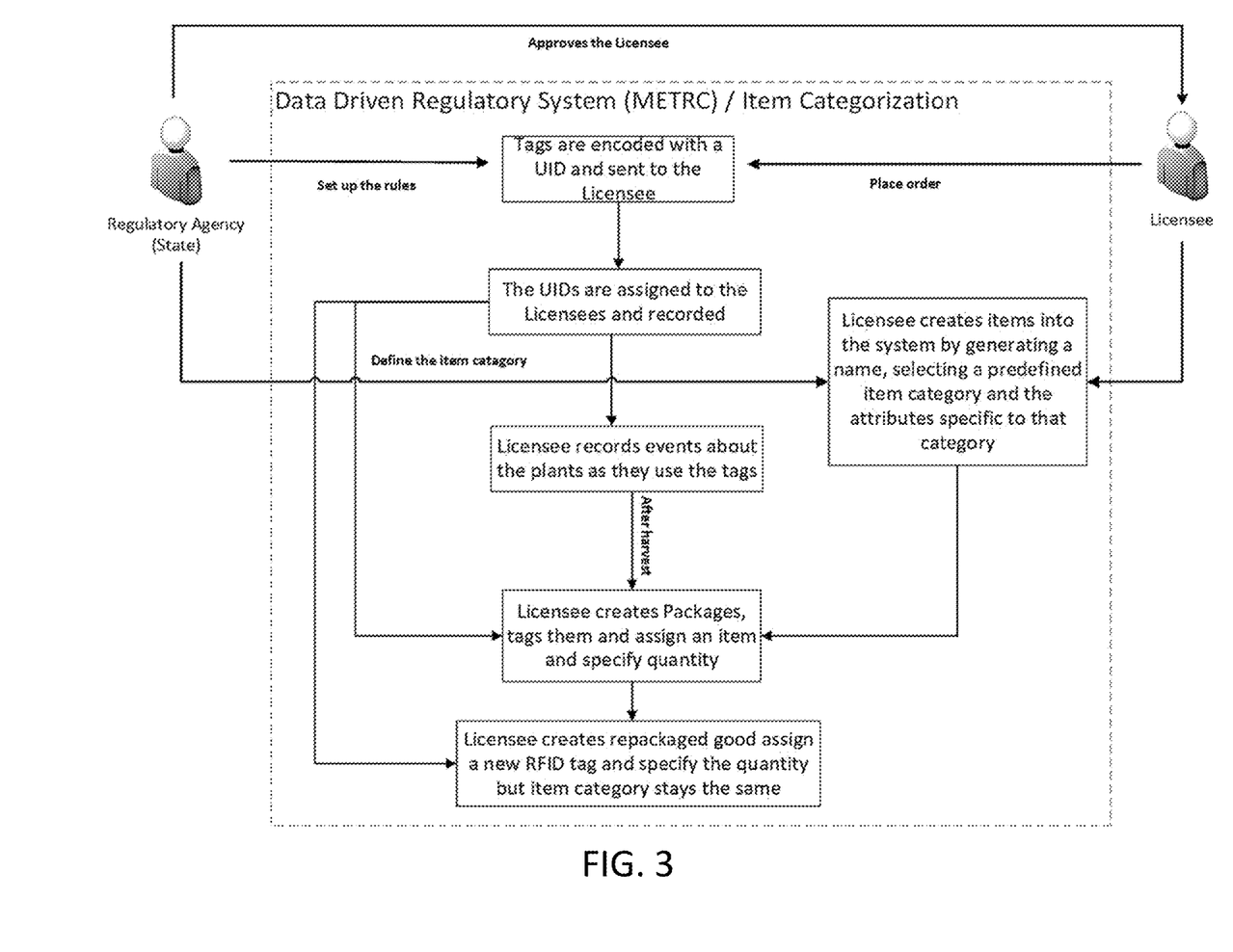
FIG. 3 is a flow chart of the functioning of an embodiment of a system in accordance with the invention and the data exchange between the regulator, the regulated entity (industry), and the system.

FIG. 3 shows a schematic of an embodiment of the subject system, which can be implemented with a computer system incorporating a processor and memory, where a regulatory entity (e.g., a state) sets up the rules of regulation for a product (e.g., cannabis) and defines item categories for the product to be regulated, and a regulated entity (e.g., licensee) places orders for UIDs, and places orders for physical markers (e.g., RFID tags) or requests for authorization to produce or procure such physical markers, where each physical marker incorporates a corresponding UID. The communication from the regulator and regulated entity can be sent to a central organization, which can then record the appropriate data in the system, generate the UIDs and send appropriate physical markers to the regulated entity (or authorize production of procurement of same). FIG. 3 shows the physical markers being encoded with the UIDs and sent to the regulated entity. The UIDs are assigned to the regulated entity and encoded in the system. The regulated entity can then send updates (events) regarding how UIDs are to be assigned to plants or other products (origin events), along with other events and item categories associated with activities regarding such plants or other products.

Figure 4:
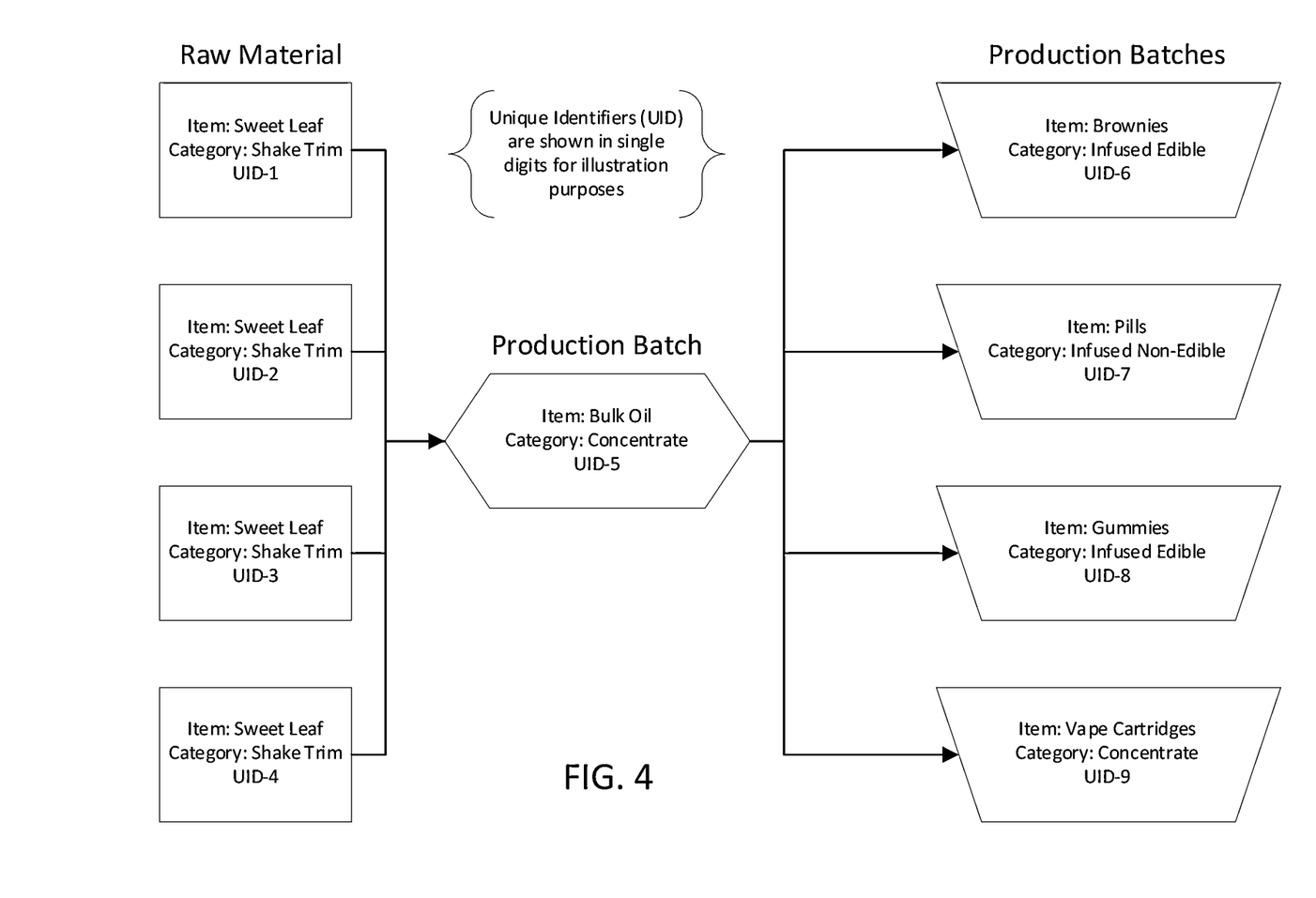
FIG. 4 illustrates specific packaging and/or repackaging events that can take place in a specific embodiment.

FIG. 4 illustrates an example of different types of packages and their item categories that are created from a harvest, with respect to an embodiment regulating cannabis. Whenever a grower (e.g., licensee, regulated entity) creates a new package, the grower needs to place and assign a physical marker, such as a package RFID tag having the UID that the grower ordered from the central organization administering the system (e.g., the grower will select an item category that the grower created earlier for each package). Referring to FIG. 4, each of the four packages of leaf (to the left) has an associated UID (UID-1, UID-2, UID-3, and UID-4 in FIG. 4), which is associated with the UID from the plants harvested to create the package of leaf. When the four packages of leaf are then used to produce the package of bulk oil (in the center), another UID is then associated with the package of bulk oil (UID-5 in FIG. 4) and the event of producing the package bulk oil from the four packages of leaf is the UID's origin event for the bulk oil, and all the UIDs from the four packages of leaf are associated with the bulk oil's UID, as well as how much of each package of leaf went into the bulk oil. As an example, if each package of leaf has 10 grams, it may be that all 10 grams of the first package of leaf is used, but only 5 grams from each of the other packages of leaf are used. In this case, this data is provided to the system, which records that all of the leaf of the first package is now gone, and 5 grams are remaining in each of the other 3 packages of leaf.

When the grower repacks a good, such as in the case of the bulk oil which is divided to 4 different smaller amounts (to the right) in FIG. 4, and another ingredient is added to a packaged item, each new package is assigned a new UID (UID-6, UID-7, UID-8, and UID-9 (in FIG. 4). The regulated entity (e.g., grower) needs to create a new package and select the proper item category that defines the new package. As shown in FIG. 4, the bulk oil is used to produce four new packages, namely, an infusible edible, an infused non-edible, an infused edible, and a concentrate. The creation of the four new packages from the bulk oil can be referred to as a transformation. Each of these new packages are assigned a new UID and the UID is incorporated with a physical marker, such as an RFID tag with the UID encoded in the RFID tag. The origin event creating each new package is then sent to the system to be recorded and associated with the corresponding UID. These events resulting in new packages are origin events for the corresponding UID, and future events will then be recorded, and associated with the UID, as well.

Figure 5:
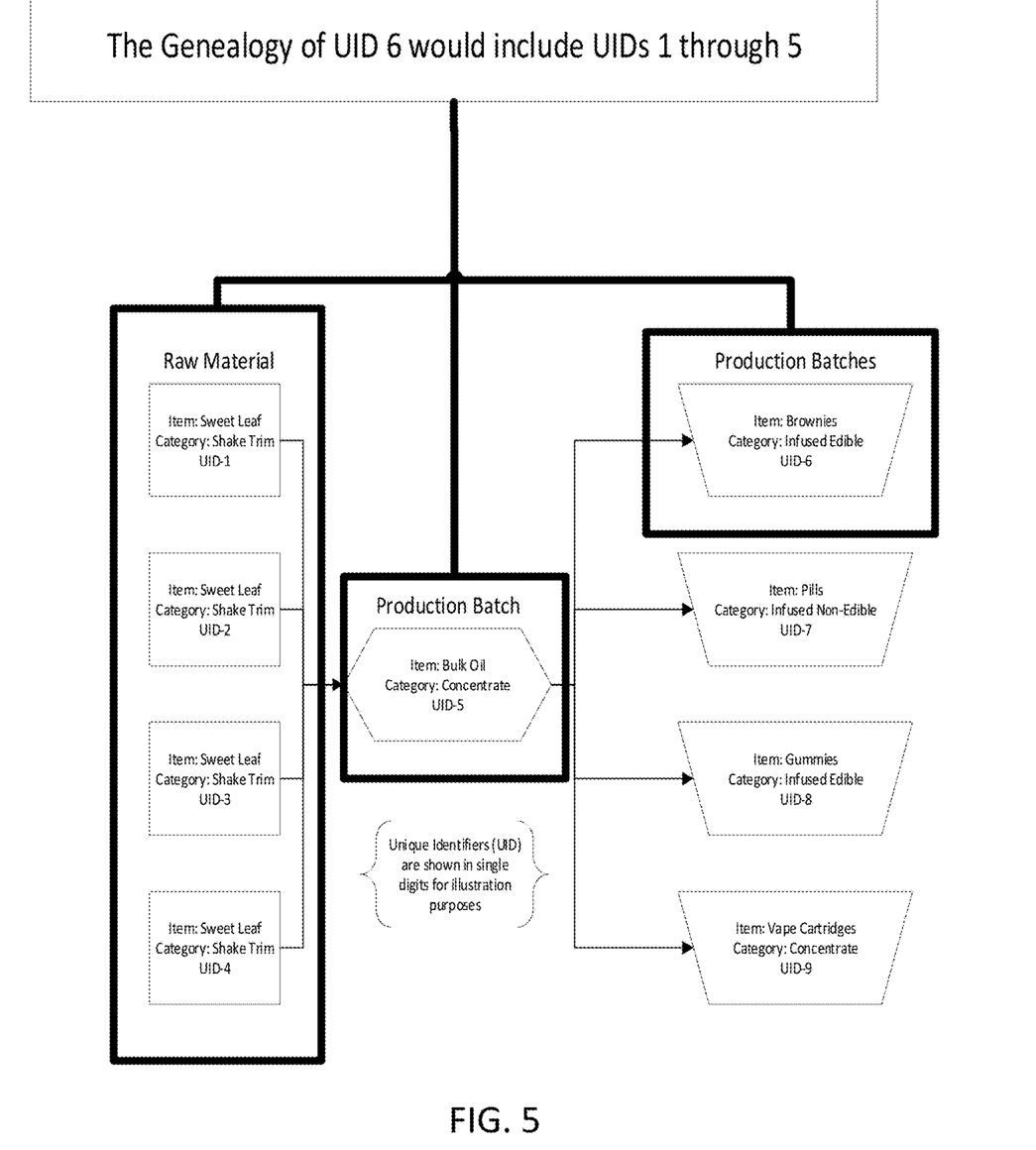
FIG. 5 shows the data collected in a package trace, including a source package, a current package, and a derived package.

FIG. 5 shows an example of a package genealogy for the processing steps of FIG. 4, where a package genealogy for the brownies (UID-6) is produced. The package genealogy for the brownies (UID-6) would include all four leaf bags (UID-1, UID-2, UID-3, and UID-4) and the bulk oil (UID-5), as portions of, or all of, each leaf bag was incorporate into the bulk oil (UID-5), and a portion of the bulk oil (UID-5) was incorporated into the brownies (UID-6). Likewise, a package genealogy for the bulk oil (UID-5) would include all four leaf bags (UID-1-UID-4) as well as all four of the products produced with the bulk oil, namely UID-6-UID-9.

Here are some other item categories, one or more of which can be used in an embodiment of the subject system relating to cannabis:
  Bud/Flower
  Shake/Trim
  Concentrate
  Extract
  Immature Plants
  Infused Edibles
  Infused Non-Edibles
  Infused PreRolls
  PreRolls
  Seeds Specific embodiments can include fewer categories, or more categories.

The industries that have regulated items (e.g., products), such as the pharmaceutical industry, medical device industry, and the tobacco industry, typically require regulated entities to register their products for approval by the FDA and/or the USDA. When such resulted entities are registering the products, they only register the products once and register them under a predefined category. Advantageously, in embodiments of the subject system the Licensee is required to register every item (product) that is being produced and not only identify the item category of the product, but also identify the sub-categories specific to the main category that are relevant for the product, and give the required information that quantifies the item to the central organization (regulatory agency). Unlike the product categorization in the current systems, categorization under embodiments of the subject system can allow each item (product) to be tracked and traced in the supply chain independently of the industry's data or system in use by third parties to the regulatory agency.

3) Package Genealogy:

Uniquely identifying (e.g., via tagging) each item in the regulated supply chain along with recording every event from origin to sale allows embodiments of the subject system to create a package trace, which no other supply chain currently produces holistically in a single system of record. Creating a package trace starts with each package having a set of tracked events recorded and associated with the package's UID. These events chronicle the history of each package. A package trace is a genealogy of a package based on all associated events. If a portion of a first package was packed into another (second) package and then a portion of that second package was repackaged into a third package (such as shown in FIG. 4), all these events are part of the first package's package trace, where the first package is the sourced package. If the first package was created from a previously existing package, then that previously existing package is also part of the package trace of the first package.

In an embodiment, package trace can be done forward or backward as needed. With a package trace, a package can be traced from end product all the way back to raw product from the harvest, or traced from the middle forward to the end product, and/or from the middle backward to the harvest. For embodiments relating to cannabis or other plants, the package trace can go backward from harvest to the plants and ultimately to the seed, clone, and/or mother plant. As an example, referring to FIG. 4, if the four leaf packages were created from harvesting one or more plants, a package trace of one of the leaf packages would include the plants that were incorporated into the leaf package upon harvest, as well as the bulk oil package and all of the packages into which the bulk oil was incorporated into. A package trace of the top right package of brownies (with item category infused edible) would have a package trace that includes the bulk oil package, all four of the leaf packages that went into the bulk oil, and all of plants that went into the four leaf packages.

Embodiments implementing package trace can organize the package trace data into a graphical hierarchy as shown in FIG. 5. The package trace shown is for the bulk oil, and does not include the plants that went into the four leaf packages.

This package trace feature can allow regulators to take a package of product from any licensee (regulated entity) and follow all the package's collective touchpoints through any other licensee, all the way back to the harvest/cultivation/origin. With this package trace tool, regulators can pinpoint every package that has been affected by a tainted package, such as a package that has a pesticide issue, that is causing adverse effects to patients, and/or has other issues and issue a recall for these specific packages.

A package track can provide a bread crumb of events associated with a uniquely identified product (UID). A plant or package having the specific UID, which can be incorporated in a physical marker (such as an RFID tag), can be associated with information stored in the system. This information can include the UID's origin (event that gave rise to the plant or package), the contents of the plant or package (such as 10 grams of buds), and events related to the plant or package (such as used 3 grams for a second UID package).

4) Inspection Process: Specific embodiments of the subject system offer an evidence and measurement based regulatory enforcement and inspection with the help of the data collected at every single event. Detecting inconsistencies in the data can be important for the inspection to identify issues such as potential illegal diversion. Here are some indicators for the inspection, one or more of which can trigger further investigation:

Plants
  Too high clone ratio of immature plants from existing plants indicates plants that were brought in through the back door (i.e., not properly documented and licensed)
  Too many plant deaths
  Plants moving back and forth from flowering to vegetative for the same tag
  Destroying plants
  Moving plants from flowering back to vegetative and then destroying plant
  Creating a clone batch then destroying it
Harvests/Manicuring
  Plants—manicuring a plant multiple times (indicating not harvesting, reusing plant tags)
  Discontinuing a harvest batch and not immediately remaking (indicating possibly reusing plant tags)
  Plant tags not moving through the cycle in a timely manner.
  Harvests adding too much weight to plants (indicating bringing in product through the back door)
  Grow dry weights too low (indicating missing plants, product going out the back door)
  Too much waste product
Packages (Repacking)
  Too many adjustments in packages and the reasons entered in the system for these adjustments
  Repackaging a smaller weight than you started with. What would help is Rooms in processors. Processors have the biggest loop hole of the industry
  Creating a test sample and then leaving the test sample there like its being tested but its not. The Licensee could discontinue a test sample and adjust the package to zero and say the product was bad and sell it out the backdoor.
  Physically tagging product but not assigning the tags in the system (e.g., METRC). On inspection it looks fine but it's not in the system (e.g., METRC). Then the Licensee can go in and void the tags in the system (e.g., METRC).
  Making less products than the licensee produces
  The same person who created the manifest/received manifest also being the person who adjusts the packages.
Transfers
  Weight outbound in transfers not equaling the same amount incoming.
  The same person receiving the transfer that created the transfer manifest.
  Adding a package onto a transfer, removing the package during route time, discontinuing the package to put the weight back into the harvest and then wasting out that amount. (selling on the road) (should be able to catch it in moisture loss) Possible notification of editing a manifest after departure time. (notification when a transfer is edited after departure, a package is removed and discontinued within a certain amount of time)
  Hiding packages on a manifest
  Retailer destroying clones close to receiving in date (selling out the back door)
  Retailer overselling packages and then removing the sales or adjusting the package but not replacing the sales or having a matching adjustment (may have untagged product they are selling, they are selling it on camera but it's not all in the system (e.g., METRC)
Sales
  If they are on the API but you are seeing sales made by user, this may be diversion.
  If their POS, METRC and physical trifecta do not match and there may be theft going on.
Theft
  Incremental package adjustment can indicate theft
  Package adjustments consider on the aggregate (not just on the single package).

5) Administrative Holds and Suspensions (Recalls)
Administrative Hold
  Embodiments of the system can implement an administrative hold tool that provides a regulator with the ability to hold packages from being transferred out of a license (regulated entity) until the regulator has completed an action (e.g., investigation, recall, etc.). A package trace can facilitate this process, and can be run in a forward direction (products incorporating product from the package being traced), backward direction (packages from which the product being traced incorporates product thereof), or in both directions. This functionality is flexible as it can be as granular as a single package, plant, or harvest batch, or as widespread as an entire product of a licensee. Regulators can also place a "Global Hold" on a package, which will put on hold any package that was derived from that package down the supply chain, even if those derivative packages are in a different license (with a different regulated entity). This allows regulators to place packages affected by a recall on hold quickly and efficiently, while also alerting the licensees to the hold through banner notifications.
  Administrative Holds may be placed on any Packages/Batches of inventory in the system (e.g., METRC) at the discretion of the regulatory body, agency, and/or State (regulator)
    Administrative holds may be placed or removed by the state (regulator) or Administrators of the central organization (e.g., METRC)
    The state (regulator) may choose how far reaching the administrative holds are to be, such as global, license specific (regulated entity specific), or product specific
    The state (regulator) can choose to put a global administrative hold on a package/batch and have all the derived children and grandchildren packages (i.e., the packages into which the identified package went into) also be put on administrative hold, as might be the case in a recall.
    The state can also choose to put a license specific administrative hold on a package/Batch, which would have all the derived children and grandchildren packages to also be put on administrative hold as to that specific license only. This administrative hold would not go further than that one specific license.

Suspensions
 If a license (e.g., regulated entity) is suspended, neither the licensee nor any of the licensee's staff, will be able to login to the system (e.g., Metre) and perform any actions.
 License suspensions done on any licenses can require a notification to be sent with a date/time of the effective date of the license suspension
 Any licensees that are suspended, and have product currently being tested by a lab, will have their packages testing status locked as "submitted for testing" because the lab that has their sample is unable to test it.
  The affected licensees can be required to create new test samples, pulled by an alternate lab representative, and tested.
  The alternate lab may then upload the new test results and those test results will be applied to the associated production batch packages/harvest batches.
  Once those test results are entered by the alternate lab, then the Licensee will need to contact the system's support to unlock the production batch packages/harvest batches because they will be locked in "testing in progress" status.

6) Random Testing and/or Test Batches

Figure 6:
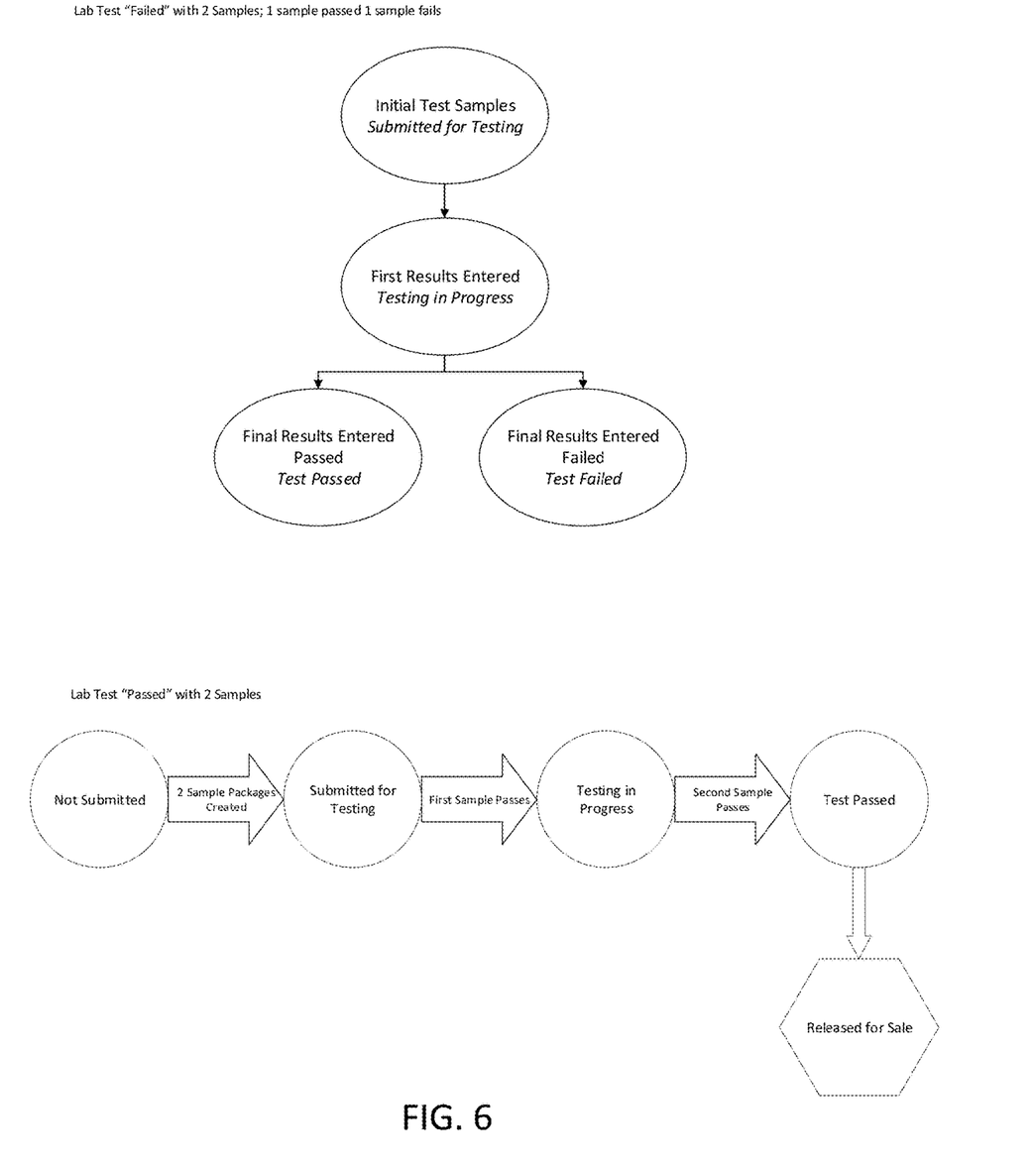
FIG. 6 shows a testing flow chart that can be used in specific embodiments.
Figure 7:
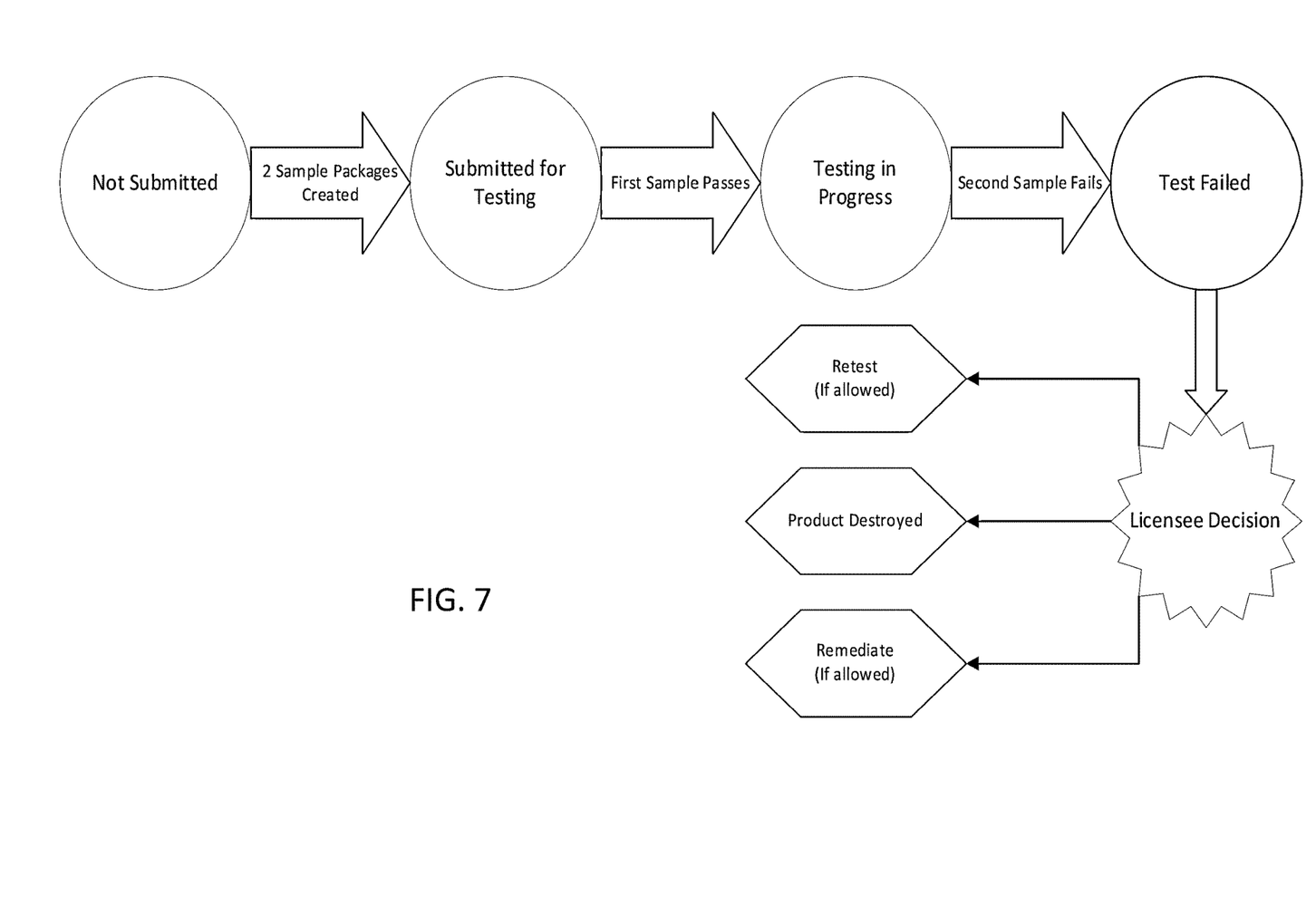
FIG. 7 shows a further testing flow chart that can be used in specific embodiments.

Each batch of a product can be required to be tested by a lab before making packages, and investigators (e.g., testing facilities) can select harvests or packages for random testing. Test batches can be subject to predefined test types that the regulatory body, agency, and/or state predefines and/or requires. FIG. 6 shows a testing flow chart for a testing procedure that can be used in specific embodiments of the invention. At the top of FIG. 6, two initial test samples are submitted for lab testing, the test results for each test sample are obtained, and as one passed and one failed, the overall lab test failed. At the bottom of FIG. 6, two initial test samples were submitted for lab testing, the test results for each test sample are obtained, and as both passed, the overall lab test passed, and the product is released for sale. Further, if both lab tests fail, the overall lab test fails. FIB. 7 shows a flow chart from FIG. 6, extended to show an embodiment where, when one sample passes and one sample fails, the regulated entity can choose to retest the product (if allowed), destroy the product, or remediate the cause of the test failure (if allowed).

7) Notifications

Notifications can be controlled and created by the system (e.g., METRC) rules engine. Notifications are designed to help regulatory oversight by raising a flag and message when a violation occurs. Each notification can be configured as minor to severe, and the message can be tailored accordingly. A minor notification might just log the notification, whereas a severe notification might involve an immediate email or text to a regulatory official and/or licensee.

8) Approval by the Regulator/Validation

The item approval functionality of the system (e.g., METRC) allows regulators the ability to require approval of an item (e.g., package) when the item is created by the licensee (regulated entity). This item approval can be required before the item can be used and, if desirable, product photo, label, and packaging images can be included. Within the workflow, regulators are provided the ability to approve, reject, deny, or revoke a product and add notes from the regulator to provide explanation to the licensee as to the reason of the action. If rejected, the licensee can edit item information according to the feedback from the state (regulator) and resubmit for review. This provides desirable oversight for the regulators on ensuring the items being produced and sold in the marketplace are appropriate and meet requirements.

9) Reports

The regulator can explore all reported data from the industry (regulated entity). These reports are essential for the investigation. Here is a guideline how to use the reporting in accordance with an embodiment of the system:
 1. Print Package Adjustment Report once a week
  a. Shows problems with Inventory Control
  b. Possible Theft
  c. Potential compliance issues
 2. Export & Print Real-time Reports from the Plants, Harvests, Packages and Transfers grids to give you a real-time report of inventory
  a. Prior to Licensee visit
   i. Run report prior to contacting licensee to ensure accurate inventory prior to contact
   ii. Run Report prior to visiting licensee to ensure accurate inventory prior to arrival
   iii. Compare first report to second report for variations
  b. Surprise Inspection
   i. Run Report prior to visiting licensee to ensure accurate inventory of product for physical inspection
   ii. Compare physical inventory to electronic inventory in the system (e.g., METRC) for discrepancies and lack of compliance
   iii. Choose 10% of each category of the inventory to spot check against the reports printed 10) Data Analyses The data that is collected through the reporting can be used by the Regulator not only to oversee the industry (regulated entity), but also to detect fraud, such as to identify the products that are sold illegally.

Figure 8:
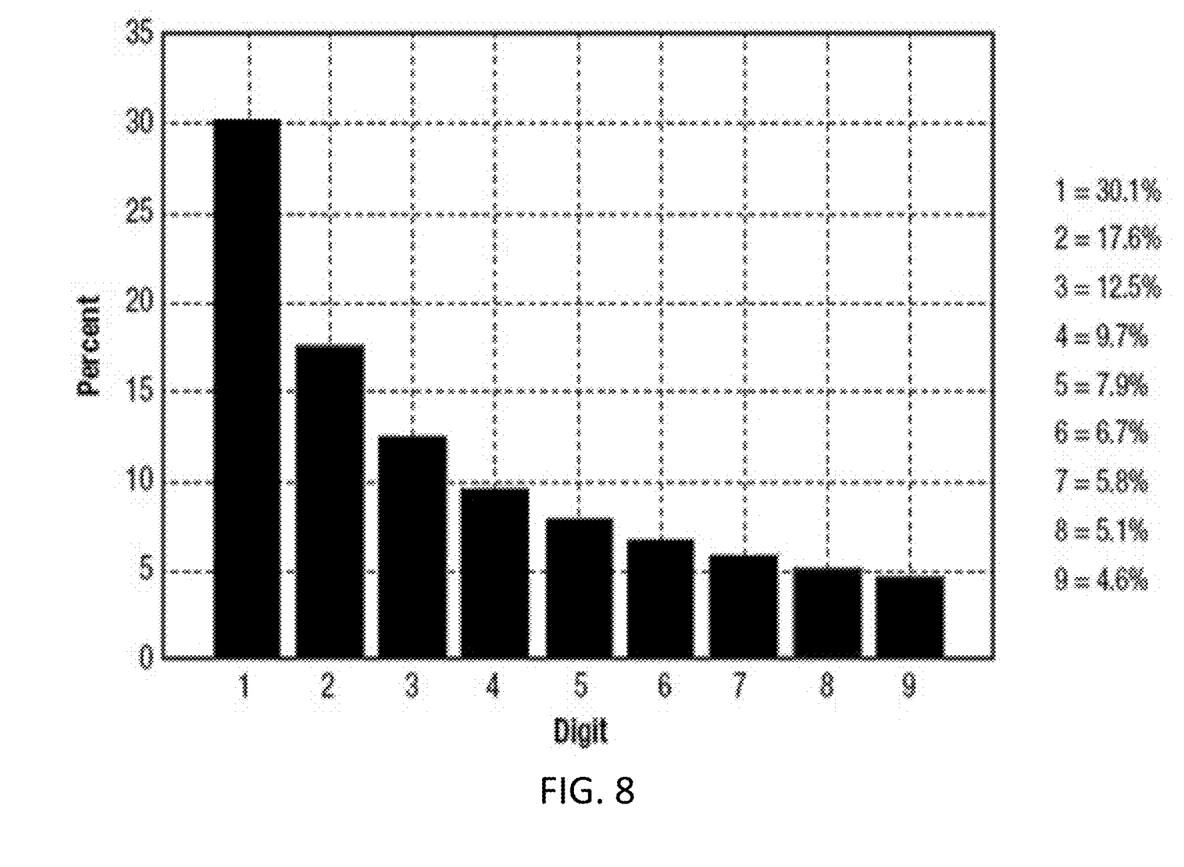
FIG. 8 shows the chart of Benford's Law 1st digits distribution.

Embodiments of the invention implement a statistical interpretation of Benford's Law in the analysis of the data for fraud detection for regulated products such as cannabis. Benford's law is a mathematical theory involving leading digits of the numbers found in a diverse set of naturally occurring datasets. Based on this theory published in "The law of anomalous numbers," Proceedings of the American Philosophical Society (1938), by Frank Benford suggests that the leading digits of these numbers are not distributed uniformly. The law gives a prediction of the frequency of leading digits using base-10 logarithms that predicts specific proportion of occurrences of the digits from 1-9, which decrease as the digits increases. More specifically, the proportion of occurrences of the first digits 1 to 9 is 30.1%, 17.6%, 12.5%, 9.7%, 7.9%, 6.7%, 5.8%, 5.1%, 4.6% respectively. FIG. 8 shows the chart of Benford's Law 1st digits distribution.

For Benford's law to be applicable there are some rules that the data needs to meet. The data must
 1) Be numeric data.
 2) Be randomly generated numbers:
  Not restricted by maximums or minimums
  Not assigned numbers.
 3) Be large.
 4) Represent magnitude of orders (e.g., numbers migrate up through 10, 100, 1,000, 10,000, etc.).

Benford's law also make predictions for the second and the third digits.

The Benford's law is commonly used for detection fraud in credit card transactions, purchase orders, loan data, customer balances, stock prices, payable transactions, inventory prices, customer refunds, elections, etc. Embodiments of the subject system (e.g., METRC) not only collects data about the sale of the products, but it also collects multiple data about the harvest, such as plant weight or plant volume of a harvest batch, plant waste weight or volume from a harvest, total package weight or volume of packages sold from a harvest, the moisture loss, and sale. The variability of harvest batches where each different types of cannabis are batched separately and the nature of a living organisms the data is random, large, and represents magnitude of orders, which meets the criteria of Benford's law. By applying the Benford's law and fitting each of these data sets into a curve one can predict if the data is generated or actual data. Then machine learning algorithms can pinpoint where the abnormality is, and which data is being manipulated or forged. Similar to cannabis industry, Benford's law can be used for other regulated industries, where volume or the weight of the product produced or sold (including raw material for sale), are recorded throughout the life cycle of the product from raw material to sale, including the volume or the weight from the product or byproducts, to detect fraud or anomaly.

11) Manifests

Historically, manifests, including the customs control applications, were submitted to government after the items are shipped and the carriers are instructed to present paper manifests for their arriving conveyances. However, embodiments of the subject system can require a licensed distributor to generate a shipping manifest through the system before transporting any cannabis goods. The shipping manifest must accurately reflect the inventory being transported from the originating facility. A shipping manifest may not be changed or voided during transport, or at any point after the shipment departs the originating licensed premises. A physical, accurate copy of the manifest always needs to be carried along with the items during transportation.

By submitting the manifest before the transportation, the government agency gains a control of all the transportation and is able to reject a transportation before it leaves origin. Historically, a security paper that shows any alteration on the paper needed to be used to identify the authenticity of the document.

By keeping the manifests in the government system and not allowing them to change after the shipment departs, the system brings more security and control over the manifest and eliminates the need of the security paper usage.

Here are some of the information that the manifests must have in accordance with an embodiment: Manifest number, license type, license of origin, destination license, type of transfer, package count, estimated departure and arrival time, date created, date received, and the fact that it is voided or not.

In some cases, the transporter can update the departure and the arrival time or the information about the driver. They have different accounts that they can only see the transfers and only be able to edit these sections. Since all these changes are made through the government approved system, the government has real time updates on all the manifests.

Aspects of the invention, such as providing a monitoring system receiving and processing requests from regulated entities, receiving and storing data regarding events relating to regulated products, storing data regarding production and/or sale of product, may be described in the general context of computer-executable instructions, such as program modules, being executed by a computer. Generally, program modules include routines, programs, objects, components, data structures, etc., that performs particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, protocols, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, workstations, and other machines may be connected to one another across a communication medium including, for example, a network or networks.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and non-volatile media, transitory and non-transitory, transient and non-transient media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile disks (DVD), holographic media or other optical disk storage, magnetic cassettes, magnetic tape, magnetic disk storage, and other magnetic storage devices. These technologies can store data momentarily, temporarily, or permanently.

The invention may be practiced in distributed-computing environments where tasks are performed by remote-processing devices that are linked through a communications network. In a distributed-computing environment, program modules may be located both in local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The present invention may be practiced in a network environment such as a communications network. Such networks are widely used to connect various types of network elements, such as routers, servers, gateways, and so forth. Further, the invention may be practiced in a multi-network environment having various, connected public and/or private networks.

Communication between network elements may be wireless or wireline (wired). As will be appreciated by those skilled in the art, communication networks may take several different forms and may use several different communication protocols. And the present invention is not limited by the forms and communication protocols described herein.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all FIGS. and tables, to the extent they are not inconsistent with the explicit teachings of this specification.

The invention claimed is:

1. A method of monitoring product production and sale of a government regulated product, the method comprising:
providing a monitoring system;
receiving from a regulated entity a request for at least one first unique identification (UID) and at least one second UID;
providing to the regulated entity the at least one first UID and the at least one second UID;
providing to the regulated entity one of the following:
(i) a corresponding at least one first physical marker, wherein each first physical marker incorporates a corresponding first UID of the at least one first UID, and a corresponding at least one second physical marker, wherein each second physical marker incorporates a corresponding second UID of the at least one second UID, or
(ii) authorization to produce or procure a corresponding at least one first physical marker, wherein each first physical marker incorporates a corresponding first UID of the at least one first UID, and a corresponding at least one second physical marker, wherein each second physical marker incorporates a corresponding second UID of the at least one second UID;
recording in the monitoring system, and associating with the regulated entity in the monitoring system, the at least one first UID and the at least one second UID;
receiving from the regulated entity a first origin event with respect to each first UID of the at least one first UID, wherein the first origin event includes a corresponding first product of a first origin item category;
recording in the monitoring system the first origin event with respect to each first UID of the at least one first UID, wherein the recorded first origin events are associated with the corresponding first UID;
receiving from the regulated entity a second origin event with respect to each second UID of the at least one second UID, wherein the second origin event includes a corresponding second product of a second origin item category, wherein the second product incorporates at least a portion of the first product such that the second UID corresponding to the second product is associated with the first UID corresponding to the first product;
recording in the monitoring system the second origin event with respect to each second UID of the at least one second UID, wherein the recorded second origin events are associated with the corresponding second UID; and
after recording the first origin event with respect to each first UID and the second origin event with respect to each second UID, utilizing the at least one second UID to perform an evidence and measurement based inspection of the second product to identify diversion of government regulations that regulate the second product,
wherein the method further comprises:
attaching the at least one first physical marker to the first product;
attaching the at least one second physical marker to the second product; and
reading the at least one first physical marker and transmitting the at least one UID to a regulatory agency, and reading the at least one second physical marker and transmitting the at least one second UID to the regulatory agency, such that the regulatory agency has a record of a state of the product production of the government regulated product.

2. The method according to claim 1, further comprising:
providing a regulatory agency access to the monitoring system.

3. The method according to claim 1,
wherein the method comprises providing to the regulated entity the at least one first physical marker incorporating the corresponding at least one first UID, and providing to the regulated entity the at least one second physical marker incorporating the corresponding the at least one second UID.

4. The method according to claim 1,
wherein the method comprises providing to the regulated entity authorization to produce or procure the at least one first physical marker incorporating the corresponding at least one first UID, and providing to the regulated entity authorization to produce or procure the at least one second physical marker incorporating the corresponding the at least one second UID.

5. The method according to claim 1,
wherein the at least one first UID is encoded in the corresponding at least one first physical marker in a readable format and the at least one second UID is encoded in the corresponding at least one second physical marker in the readable format, and
wherein the readable format is selected from a RFID readable format, a bar code, and a QR code.

6. The method according to claim 1,
wherein the at least one first physical marker incorporates the corresponding at least one first UID in a visually readable manner,
wherein the at least one second physical marker incorporates the corresponding at least one second UID in a visually readable manner.

7. The method according to claim 1, wherein the second origin item category is different than the first origin item category.

8. The method according to claim 1, wherein the second origin item category is the same as the first origin item category.

9. The method according to claim 1, further comprising:
receiving from the regulated entity at least one first after origin event with respect to a first product associated with a corresponding first UID of the at least one first UID, and
recording in the monitoring system, and associating with the corresponding first UID of the at least one first UID in the monitoring system, the at least one first after origin event.

10. The method according to claim 1,
wherein the second origin event indicates a quantity of the first product that is incorporated into the second product.

11. The method according to claim 1,
wherein the regulated product is cannabis.

12. The method according to claim 11, further comprising:
receiving from the regulated entity at least one first after origin event with respect to a first product associated with a corresponding first UID of the at least one first UID, and
recording in the monitoring system, and associating with the corresponding first UID of the at least one first UID in the monitoring system, the at least one first after origin event;
wherein the first product is a cannabis plant,
wherein the at least one first after origin event includes a cultivation event occurring during cultivation of the cannabis plant and a harvest event occurring during harvesting of the cannabis plant.

13. The method according to claim 12,
wherein the second origin event is the harvest event,
wherein the second origin item category is a harvest package,
wherein the second physical marker incorporating the corresponding second UID of the at least one second UID is assigned to the harvest package.

14. The method according to claim 13,
wherein the harvest event includes a plurality of cannabis plants and the harvest event is associated with all the first UIDs of the plurality of cannabis plants in the harvest.

15. The method according to claim 12,
wherein the at least one first after origin event includes one or more of the following:
plant growth stage; plant location; plant strain; plant weight; additives used during cultivation of the plant; plant waste weight; harvest weights; and update information until harvest.

16. The method according to claim 11,
wherein the at least one first physical marker and the at least one second physical markers are RFID tags.

17. The method according to claim 11,
wherein the first origin item category is selected from the following: bud, flower, shake, trim, concentrate, extract, immature plants, infused edibles, infused non-edibles, infused prerolls, prerolls, and seeds.

18. The method according to claim 11,
wherein the second origin item category is related to a parameter selected from product type, quantity type, strain, black market identification CBD %, and THC %, and
wherein quantity type is selected from weight and number of cannabis plants.

19. The method according to claim 1, further comprising:
receiving a new item category for a new packaged product from the regulated entity, wherein the new packaged product is the second product with an ingredient added.

20. The method according to claim 1, further comprising:
receiving one or more sub-item specific to the second origin item category.

21. The method according to claim 1, further comprising:
wherein the second product is a packaged product,
wherein the packaged product recorded in the monitoring system is legal, and any packaged product not recorded in the monitoring system is illegal.

22. The method according to claim 1,
wherein the at least one first physical marker is a biological element; and wherein the at least one second physical marker is a biological element.

23. The method according to claim 1, further comprising:
creating a package genealogy with respect to a first UID of the at least one first UID,
wherein the package genealogy includes the second UID of the at least one second UID associated with the first UID of the at least one first UID.

24. The method according to claim 1, further comprising:
creating a package genealogy with respect to a second UID of the at least one second UID; and
using the package genealogy to determine which packaged products are affected by an administrative hold and/or recall,
wherein the package genealogy includes the first UID of the at least one first UID associated with the second UID of the at least one second UID.

25. The method according to claim 1, further comprising:
issuing a real time manifest.

26. The method according to claim 1,
wherein the at least one first UID and the at least one second UID have the same format.

27. The method according to claim 1, wherein the at least one physical marker and the at least one second physical marker are RFID tags.

28. The method according to claim 1, further comprising:
generating a dataset comprising the first origin event with respect to each first UID of the at least one first UID and the second origin event with respect to each second UID of the at least one second UID; and
detecting fraud by analyzing the dataset using Benford's law, wherein Benford's law is applied to a weight of the government regulated product, a volume of the government regulated product, a wet weight of the government regulated product, and/or a waste weight of the government regulated product,
wherein the analyzing of the dataset comprises using machine learning to identify an abnormality in the dataset, a manipulation in the dataset, and/or a forgery in the dataset.

29. The method according to claim 1, further comprising:
generating a dataset comprising the first origin event with respect to each first UID of the at least one first UID and the second origin event with respect to each second UID of the at least one second UID; and
detecting fraud by analyzing the dataset using Benford's law, wherein Benford's law is applied to a weight of the government regulated product, a volume of the government regulated product, a wet weight of the government regulated product, and/or a waste weight of the government regulated product,
wherein the analyzing of the dataset comprises using machine learning to identify an abnormality in the dataset, a manipulation in the dataset, and/or a forgery in the dataset.

30. The method according to claim 1, further comprising:
after recording the first origin event with respect to each first UID and the second origin event with respect to each second UID, utilizing the at least one second physical marker and the at least one second UID to perform lab testing on the second product to determine if it meets standards of a regulatory agency;
upon the second product passing the lab testing by meeting the standards of the regulatory agency, offering the second product for sale; and
upon the second product failing the lab testing by not meeting the standards of the regulatory agency, refusing to offer the second product for sale.

31. A system for monitoring product production and sale of a government regulated product, the system comprising:
- a monitoring system incorporating a processor, wherein the processor is configured to receive from a regulated entity a request for at least one first unique identification (UID) and at least one second UID, wherein the processor is configured to:
- provide to the regulated entity the at least one first UID and the at least one second UID;
- record in the monitoring system, and associating with the regulated entity in the monitoring system, the at least one first UID and the at least one second UID;
- receive from the regulated entity a first origin event with respect to each first UID of the at least one first UID, wherein the first origin event includes a corresponding first product of a first origin item category;
- record in the monitoring system the first origin event with respect to each first UID of the at least one first UID, wherein the recorded first origin events are associated with the corresponding first UID;
- receive from the regulated entity a second origin event with respect to each second UID of the at least one second UID, wherein the second origin event includes a corresponding second product of a second origin item category, wherein the second product incorporates at least a portion of the first product such that the second UID corresponding to the second product is associated with the first UID corresponding to the first product; and
- record in the monitoring system the second origin event with respect to each second UID of the at least one second UID, wherein the recorded second origin events are associated with the corresponding second UID, wherein the system further comprises:
- a first physical marker attached to the first product and incorporating a corresponding first UID of the at least one first UID; and
- a second physical marker attached to the second product and incorporating a corresponding second UID of the at least one second UID,
- wherein the system is configured to read the first physical marker and transmit the at least one UID to a regulatory agency, and read the second physical marker and transmit the at least one second UID to the regulatory agency, such that the regulatory agency has a record of a state of the product production of the government regulated product, and
- wherein the system is further configured such that, after recording the first origin event with respect to each first UID and the second origin event with respect to each second UID, the at least one second UID is utilized to perform an evidence and measurement based inspection of the second product to identify diversion of government regulations that regulate the second product.

32. The system according to claim 31, wherein the processor is further configured to:
- generate a dataset comprising the first origin event with respect to each first UID of the at least one first UID and the second origin event with respect to each second UID of the at least one second UID; and
- detect fraud by analyzing the dataset using Benford's law, wherein Benford's law is applied to a weight of the government regulated product, a volume of the government regulated product, a wet weight of the government regulated product, and/or a waste weight of the government regulated product,
- wherein the analyzing of the dataset comprises using machine learning to identify an abnormality in the dataset, a manipulation in the dataset, and/or a forgery in the dataset.

33. The system according to claim 31, wherein the system is further configured such that:
- after recording the first origin event with respect to each first UID and the second origin event with respect to each second UID, the at least one second physical marker and the at least one second UID are utilized to perform lab testing on the second product to determine if it meets standards of a regulatory agency;
- upon the second product passing the lab testing by meeting the standards of the regulatory agency, the second product is offered for sale; and
- upon the second product failing the lab testing by not meeting the standards of the regulatory agency, the second product is refused to be offered for sale.

* * * * *